Figure 1:
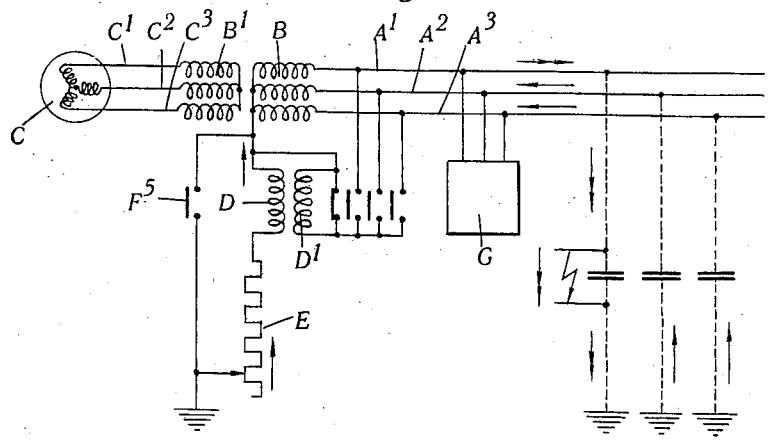

March 7, 1939.  H. LEYBURN  2,149,683
EARTH FAULT CONTROL ARRANGEMENT FOR POLYPHASE ALTERNATING
CURRENT TRANSMISSION AND DISTRIBUTION SYSTEMS
Filed Nov. 2, 1937   3 Sheets-Sheet 1

Henry Leyburn  INVENTOR
BY Watson, Coit, Morse & Grindle
ATTORNEY

March 7, 1939.    H. LEYBURN    2,149,683
EARTH FAULT CONTROL ARRANGEMENT FOR POLYPHASE ALTERNATING
CURRENT TRANSMISSION AND DISTRIBUTION SYSTEMS
Filed Nov. 2, 1937    3 Sheets-Sheet 3

Henry Leyburn INVENTOR
BY
Watson, Coit, Morse & Grindle
ATTORNEY

Patented Mar. 7, 1939

2,149,683

UNITED STATES PATENT OFFICE 2,149,683

EARTH FAULT CONTROL ARRANGEMENT FOR POLYPHASE ALTERNATING CURRENT TRANSMISSION AND DISTRIBUTION SYSTEMS

Henry Leyburn, Newcastle-upon-Tyne, England, assignor to A. Reyrolle & Company Limited, Hebburn-on-Tyne, England, a company of Great Britain Application November 2, 1937, Serial No. 172,490
In Great Britain November 12, 1936

24 Claims. (Cl. 172—237)

This invention relates to improvements in earth-fault control arrangements for polyphase A. C. transmission and distribution systems. The invention is more particularly concerned with control arrangements for suppressing the arc which occurs on the occurrence of an earth fault on such systems and, whilst it is mainly applicable to systems having overhead line networks, it can also be used with systems employing cables.

It has been found that with overhead line networks usually more than 90% of the faults are earth faults and that many of these faults are caused by lightning, birds, falling branches or other transient phenomena so that, provided the arc formed when the fault occurs can be extinguished, the fault is only of a temporary and relatively harmless nature. Various expedients have been proposed for dealing with such earth faults including, for example, earthing the neutral point of the system either directly or through a resistance of low value, so that the power current which flows through the fault may be sufficient to cause earth-fault protective gear to operate to isolate the faulty section of line, continuity of supply being ensured by the use of parallel feeders or a ring main arrangement.

Another arrangement which has been used is to connect the neutral point of the system to earth through a choke coil, usually known as a Petersen coil, which has a reactance bearing a definite relationship to the capacitance between the overhead line network and earth. On the occurrence of an earth fault on one phase of a polyphase system having an earthed neutral point, the current flowing through the fault can be regarded as made up of two components. The first component comprises current from the healthy phases passing through the capacitances of these phases to earth and through the fault and faulty phase conductor to the neutral point, whilst the second component comprises the current driven by the voltage of the faulty phase along the phase conductor through the fault to earth and back through earth and the earthing connection to the neutral point. The circuit in which the first of these current components flows is mainly capacitative whilst in the Petersen coil arrangement the circuit in which the second component flows is rendered mainly reactive by the inclusion of the coil in the earthing connection. The two current components are thus flowing in opposite directions at the fault and, provided the Petersen coil is chosen so that these currents are substantially equal, there will be no appreciable current flowing through the fault, the fault arc will go out and the system continue to function without further disturbance.

This arrangement, whilst it acts satisfactorily to supress the fault arc, has, however, several disadvantages of which probably the most important is that the Petersen coil, when properly adjusted, forms with the line capacitance a resonant circuit with the result that oscillations may occur and over-voltages be produced in the system. Further disadvantages of the Petersen coil are that both the circuits referred to above contain resistive components so that the two currents cannot be completely balanced out and that the Petersen coil cannot control the speed at which the voltage reappears at the fault so that, should the voltage recover quickly, the arc may restrike due to the presence of ionised air. This tendency of the arc to restrike makes it essential that the value of the Petersen coil should be adjusted to reduce the current flowing through the arc to the smallest possible value, such adjustment being necessary each time the network conditions are changed, for example, when switching-in or switching-out a part of the system.

The main object of the present invention is to provide an improved earth-fault control arrangement in which arc suppression is obtained at least as effectively as with the Petersen coil arrangement described above but in which the tendency to resonance and the other above-mentioned disadvantages of the Petersen coil arrangement are avoided.

In the earth-fault control arrangement according to the present invention a neutral point of the system is directly or indirectly connected to earth through an impedance, such as a resistance, which does not cooperate with the capacitance of the system to earth to form a resonant circuit and means are provided whereby on the occurrence of an earth fault on one of the phases, the faulty circuit has injected into it a voltage which is so related to the voltage of the faulty phase as to produce a current substantially equal and opposite to the earth-fault current flowing before the injection voltage is applied.

Conveniently the injection voltage is derived from one of the healthy phases, preferably a phase with a voltage lagging behind the voltage of the faulty phase. The voltage may be injected into the faulty circuit by a transformer having its secondary winding connected in series in the circuit, preferably in series in the neutral earthing connection, and its primary winding connected to the source of the injection voltage. The earthing impedance may be connected in circuit either with the secondary or with the primary of the injection transformer.

In a preferred arrangement, the primary winding of the injection transformer is normally disconnected from the source and, preferably, short-circuited, and the selecting means operable on the occurrence of an earth fault, act to connect the transformer primary winding to a source of voltage having the appropriate phase relationship to the voltage of the faulty phase. The injection transformer is preferably in effect short-circuited through a normally closed switch connected between the mid point of the earthing impedance and the mid point of the injection transformer winding in circuit with such impedance.

Conveniently the neutral earthing connection is associated with the secondary of a step-up power transformer through which the system is fed. The injection voltage may be derived either from the low tension side or from the high tension side of such power transformer.

Figure 2:
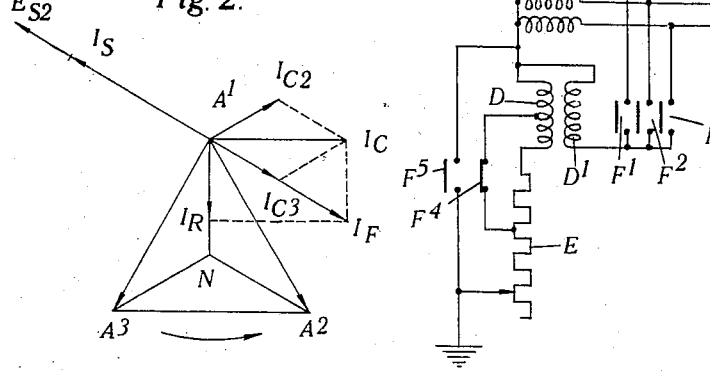
Figure 3:
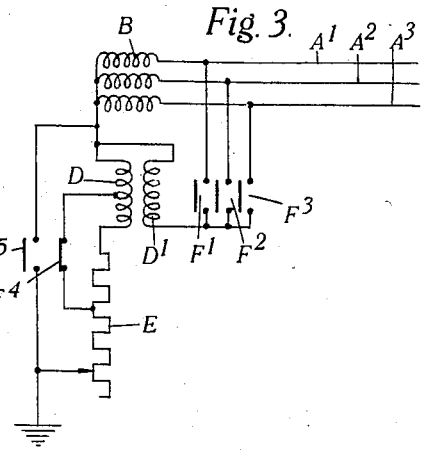
Figure 4:
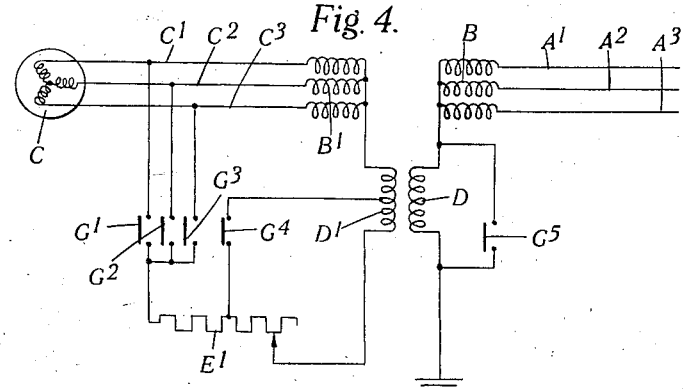
Figure 5:
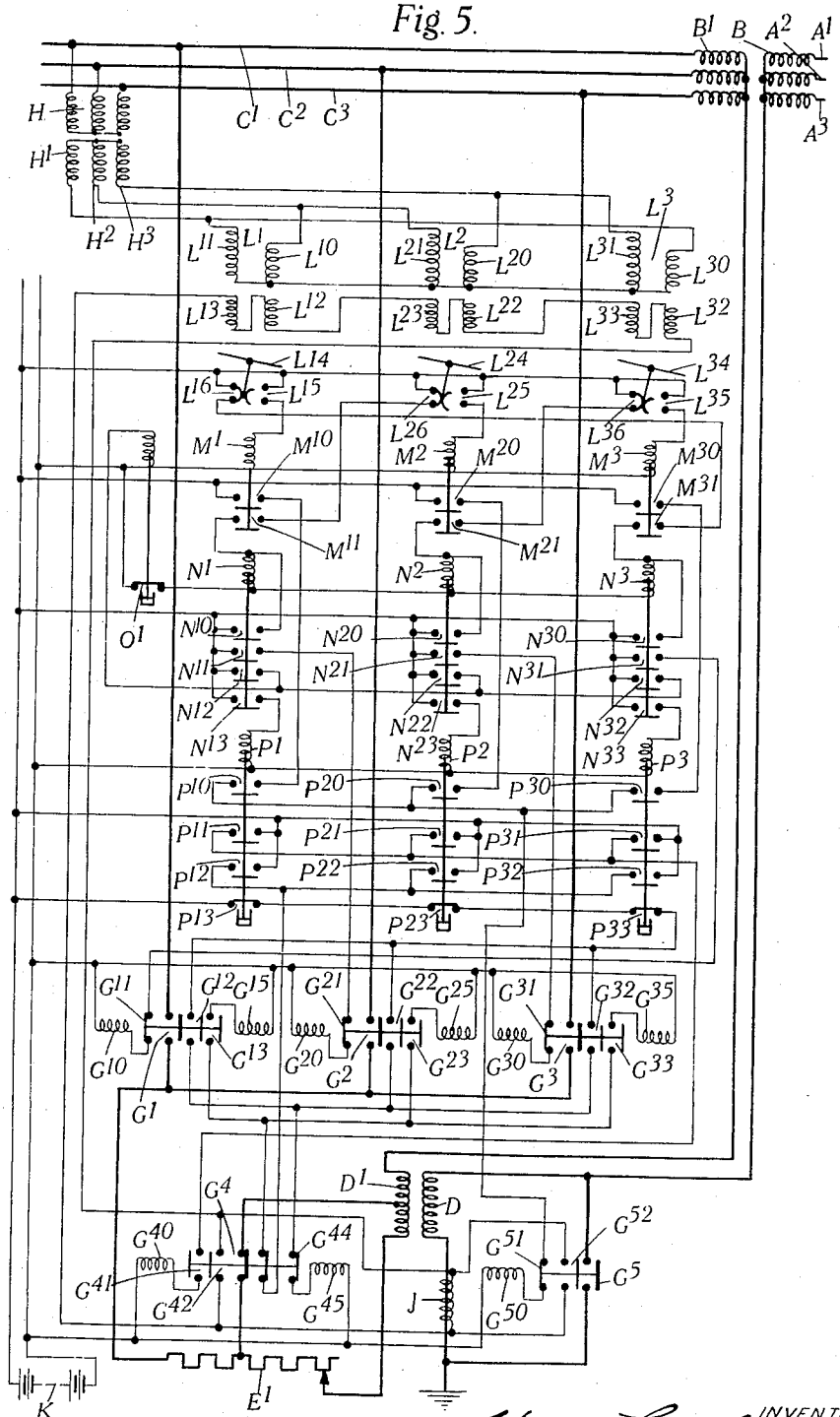
Figure 6:
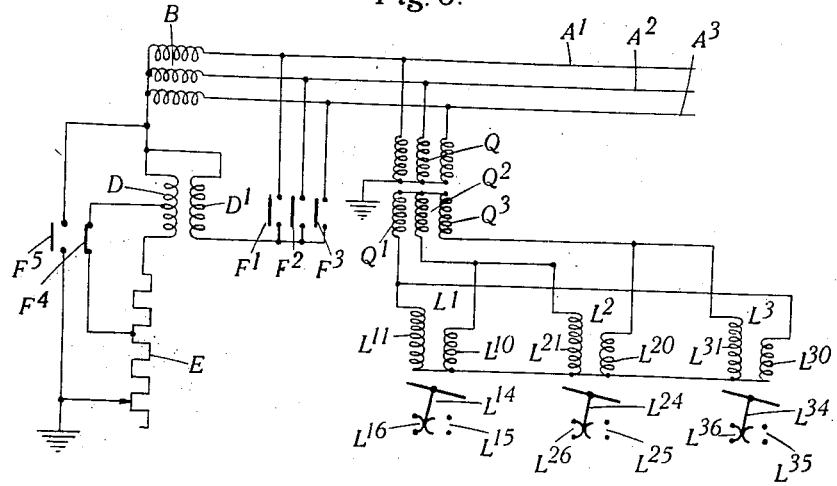
Figure 7:
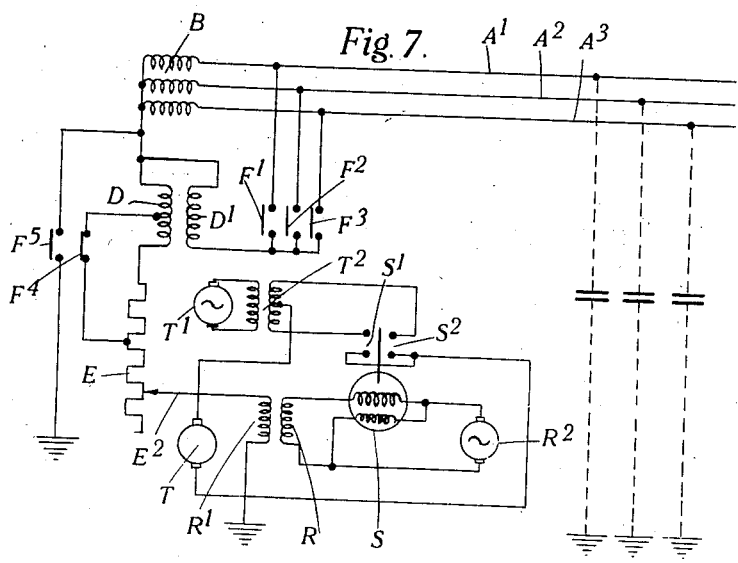

The invention may be carried into practice in various ways, but some convenient arrangements in which the invention is applied to a three-phase overhead line distribution system are illustrated by way of example in the accompanying drawings, in which Figure 1 diagrammatically illustrates one simple arrangement, Figure 2 is a vector diagram showing the voltage and current conditions on the occurrence of an earth fault, Figure 3 shows a modification of the arrangement of Figure 1, Figure 4 diagrammatically illustrates an alternative arrangement, Figure 5 is a complete circuit diagram of a practical embodiment of the arrangement of Figure 4, Figure 6 shows a modification of Figure 5 to suit the arrangement of Figure 3, and Figure 7 is a circuit diagram showing a device for automatically adjusting the earthing resistance as applied to the arrangement of Figure 3 or Figure 6.

In these arrangements the three phase conductors $A^1A^2A^3$ of the overhead line are connected to the star-connected secondary B of a power transformer, whose primary $B^1$ is energised through a low tension circuit $C^1C^2C^3$ from a generator C. In cases where the overhead line is fed in other ways, without a star-connected transformer secondary, means well-known in themselves are provided to create an artificial neutral point.

In the arrangement of Figure 1 the neutral point of the transformer secondary B is connected to earth through the secondary winding D of a transformer $DD^1$, which for convenience will be referred to as the injection transformer, and through an adjustable resistance E of relatively high value. One side of the primary $D^1$ of the injection transformer is connected to the star point of the power transformer secondary B, whilst the other side may be connected through a selector device (which may be of any convenient type such for example as a multiposition contact arm or a drum or other rotary controller or as shown a group of single-pole switches $FF^1F^2F^3$) to the star-point of the power transformer secondary B or to any one of the three phases $A^1A^2A^3$ of the overhead line. Normally the selector device $FF^1F^2F^3$ acts to connect the injection transformer primary winding $D^1$ to the star point, so that this winding is short-circuited and the earthing connection is normally purely resistive.

The selector device $FF^1F^2F^3$ is controlled automatically by a system of relays diagrammatically indicated at G and so arranged that, in the event of an earth fault on one of the phases of the line (say $A^1$) the switch ($F^2$) connected to that phase ($A^2$) which lags 120° behind the faulty phase $A^1$ is closed.

The vector diagram of Figure 2 shows the conditions after the occurrence of an earth fault on phase $A^1$, the vector $I_F$ representing the fault current actually flowing through the fault to earth. This fault current, before operation of the device according to the invention, is composed partly of the capacitative fault current $I_C$ returning through the two healthy phases $A^2A^3$ via their capacitances to earth, and partly of the resistive fault current $I_R$ returning through the earthing resistance E in the neutral earthing connection. The capacitative component $I_C$ leads the voltage of phase $A^1$ by 90°, since it is made up of the vectors $I_{C2}$ and $I_{C3}$ which respectively lead the interphase voltages between $A^1$ and $A^2$ and between $A^1$ and $A^3$ by 90° and are therefore phase displaced by 60° with respect to one another.

The collapse of the voltage to earth on phase $A^1$ due to the fault causes the relay system G to operate the selector device to open the short-circuiting contact F and to close the switch $F^2$ associated with the phase $A^2$ lagging behind the faulty phase by 120°, so that a voltage $E_{s2}$ in phase with the voltage to earth of phase $A^2$ is applied to the primary winding $D^1$ of the injection transformer, and the injected current $I_s$ is thereby caused to flow through the circuit comprising the injection transformer secondary winding D, the earthing resistance E, earth, the fault and back through the faulty phase $A^1$ is in phase with this voltage $E_{s2}$. The injected current $I_s$ is thus in direct phase-opposition to the fault current $I_F$ and, provided that the earthing resistance E has the appropriate relationship to the line capacitances to earth, will be equal in magnitude to $I_F$, so that the current in the earth-fault arc will cease to flow. The adjustment of the earthing resistance to the desired value may be effected by trial and error, or, if desired, any convenient means may be provided for measuring the capacitance of the overhead line to earth so that the resistance may be adjusted accordingly. One convenient measuring device arranged to effect automatic adjustment of the resistance in accordance with changes in the earth capacitance of the line due, for example, to switching operations on the network will be described later with reference to Figure 7.

The ratio of secondary turns to primary turns in the injection transformer $DD^1$ is made approximately 2:1 (when the primary is directly connected to the network conductors), but it will be appreciated that it may be desirable to modify this figure somewhat in practice in order to obtain exact phase opposition, as it is necessary to compensate for any reactance there may be (due for example to the presence of transformers) in the earthing connection and other parts of the circuit through which the injection current flows. The injection transformer may therefore be provided with tapping points for varying its ratio.

The short-circuiting of the injection transformer $DD^1$ may be effected in other ways than by means of the switch F, and Figure 3 shows a modified arrangement in which short-circuiting is effected by a switch $F^4$ connected between the mid-points of the injection transformer secondary winding D and of the earthing resistance E. In this modification one half of the injection transformer winding D acts as the primary of an autotransformer in series with half the resistance E, whilst the other half acts as the secondary thereof loaded by half the resistance E. Since the autotransformer ratio is 1:1, this modification gives in effect a total resistance in the neutral connection equal to the resistance E, and thus has precisely the same effect as is obtained by short-circuiting one of the injection transformer windings as in Figure 1.

The injection voltage has the further effect of reducing the voltage between the faulty phase and earth substantially to zero, so that the restriking voltage across the fault arc is negligibly small. The time during which the switches of the selector device remain in their operative positions is determined by the relay system G and may be of the order of, say, one second, after which the switches return to their normal positions. This time is chosen long enough to allow for the clearance of a transient earth fault of the usual type, but if the fault is persistent, it is preferable to avoid repeating the sequence of operations above described, and the relay system G is preferably arranged therefore in such a case to effect closing of a further switch $F^5$ for directly earthing the neutral point or earthing it through a relatively low resistance so that sufficient fault current will flow to cause operation of earth-fault protective gear acting to cut out the faulty section of the network.

If desired, instead of a single injection transformer in the earthing connection, a group of such transformers may be provided, one for each phase, with their secondary windings respectively connected in series in the several phases of the line, the system of relays then acting on the occurrence of a fault to cause the energization of the primary winding of the injection transformer in the faulty phase from the appropriate one of the other phases.

In the foregoing arrangements the injection current is derived from the high tension side of the power transformer, but it may be more convenient in practice to connect the injection transformer primary to the low tension side of the power transformer or to any other suitable A. C. low tension source associated with or in synchronism with the network appropriate modifications being made in the turns-ratio of the injection transformer and in the value of the earthing resistance. A typical example of such a modification is diagrammatically illustrated in Figure 4.

In the modification the injection transformer secondary winding D is directly connected between the star-point of the power transformer secondary B and earth, whilst the injection transformer primary winding $D^1$ is connected on one side to the star point of the power transformer primary $B^1$ and on the other side through an earthing resistance $E^1$ and through the normally open switches $G^1G^2G^3$ of a selector device to the three phase conductors $C^1C^2C^3$ on the primary or low tension side of the power transformer. The mid-points of the injection transformer primary $D^1$ and the earthing resistance $E^1$ are normally connected together through a short-circuiting switch $G^4$. A switch $G^5$ across the winding D is provided to correspond to the switch $F^5$ of Figures 1 and 3.

In this modification the injection transformer primary winding $D^1$ acts as an autotransformer with 1:1 ratio. Half the resistance $E^1$ is in series with the auto-transformer primary, but its secondary is not in this case loaded with half the resistance $E^1$ in the normal condition of the switches. Thus normally the effective resistance appearing in the neutral earthing connection is $2r^2E^1$, where $r:1$ is the turns ratio of the injection transformer. When, however, the short-circuiting switch $G^4$ opens, the effective resistance in the earthing connection is $r^2E^1$. This latter value is arranged to be equal to the resistance E of Figures 1 and 3, and it does not matter that the effective earthing resistance has twice this value normally since it is only during injection that the actual value of the resistance is important. The arrangement is, however, such that the neutral earthing connection is in effect purely resistive under normal conditions.

Figure 5 is a circuit diagram of the complete arrangement according to Figure 4, and shows the details of the relay system for operating the switches $G^1G^2G^3G^4G^5$. For the energisation of the various relays of the system a five-limbed potential transformer, having its primary windings H connected to the three low tension phase conductors $C^1C^2C^3$ and having secondary windings $H^1H^2H^3$, and a current transformer J on the neutral earthing connection are employed in conjunction with an auxiliary D. C. source K. The potential and current transformers are used for the energisation of three balanced beam relays $L^1L^2L^3$, one in each phase, whilst all the other relays are D. C. relays energised from the D. C. source K.

The balanced beam relay $L^1$ (or $L^2$ or $L^3$) has operating and restraining voltage coils $L^{10}L^{11}$ (or $L^{20}L^{21}$ or $L^{30}L^{31}$) and operating and restraining current coils $L^{12}L^{13}$ (or $L^{22}L^{23}$ or $L^{32}L^{33}$), and the relay contact member $L^{14}$ (or $L^{24}$ or $L^{34}$) controls operating contacts $L^{15}$ (or $L^{25}$ or $L^{35}$) and back contacts $L^{16}$ (or $L^{26}$ or $L^{36}$). The six current coils are energised in series from the current transformer J. The voltage coils $L^{11}$ and $L^{30}$ are energised from the potential transformer secondary $H^1$, the coils $L^{21}$ and $L^{10}$ from the secondary $H^2$, and the coils $L^{31}$ and $L^{20}$ from the secondary $H^3$. Normally there is no current flowing through the neutral earthing connection, so that the current coils of the relays are deenergised. The restraining voltage coil of each relay is made more powerful than the operating voltage coil, so that normally each relay back contact is held closed.

When, however, an earth-fault occurs, say on phase $A^1$, a current flows in the neutral earthing connection and causes the energisation of the current coils of the relays, so that they produce a flux in phase-opposition to the flux due to the voltage coils energised from secondary $H^1$ in the faulty phase. Consequently on the relay cores carrying the voltage coils $L^{11}$ and $L^{30}$ energised from the secondary $H^1$, the flux will collapse and, in the case of the relay $L^1$, owing to the collapse of the restraining flux, the operating contacts $L^{15}$ will be closed and the back contacts $L^{16}$ will open. On relay $L^3$ the normal restraint will be increased, whilst relay $L^2$ will still restrain slightly.

The operating contacts $L^{15}L^{25}L^{35}$ of the beam relays $L^1L^2L^3$ respectively control the energisation from the D. C. source of three repeat contactors $M^1M^2M^3$, each having two normally open contacts $M^{10}M^{11}$ or $M^{20}M^{21}$ or $M^{30}M^{31}$. The contact $M^{11}$ is connected in series with the back contact $L^{26}$ of the beam relay in the next phase in the energizing circuit of a further D. C. contactor $N^1$, the back contact being included in this circuit as a safeguard against two beam relays operating simultaneously. The contacts $M^{21}L^{36}$ likewise control a contactor $N^2$ and the contacts $M^{31}L^{16}$ a contactor $N^3$. The closing of the contact $M^{10}$ or $M^{20}$ or $M^{30}$ on the operation of the corresponding relay serves only to prepare a circuit to be referred to later.

Each contactor $N^1$ or $N^2$ or $N^3$ has four normally open contacts $N^{10}N^{11}N^{12}N^{13}$ or $N^{20}N^{21}N^{22}N^{23}$ or $N^{30}N^{31}N^{32}N^{33}$. The first contact $N^{10}$ or $N^{20}$ or $N^{30}$ of each contactor acts as a holding contact for the contactor to render it independent of the controlling beam relays, so that the deenergisation of the contactor is brought about by the opening of the normally closed contacts $O^1$ of a definite time limit relay $O$ common to all three phases. The operation of such relay $O$ is controlled by the parallel-connected contacts $N^{12}N^{22}N^{32}$ of the contactors, so that a contactor after being energised is automatically deenergised again at the expiration of the time lag of the relay $O$, which may be, say, five seconds.

The contact $N^{11}$ on closing completes an energising circuit to the closing coil $G^{20}$ of the switch $G^2$ in the next phase, this circuit including an interlock auxiliary contact $G^{21}$ on the switch $G^2$. The switch $G^2$ has two further auxiliary contacts $G^{22}G^{23}$, of which the latter is an interlock contact in the circuit of the trip coil $G^{25}$ of the switch, whilst the former acts when the switch $G^2$ closes to energise the trip coil $G^{45}$ of the short-circuiting switch $G^4$ through an interlock contact $G^{44}$, so as to open the switch $G^4$. The switch $G^1$ has closing and trip coils $G^{10}$ and $G^{15}$ and auxiliary contacts $G^{11}G^{12}G^{13}$ and the switch $G^3$ coils $G^{30}G^{35}$ and contacts $G^{31}G^{32}G^{33}$ similar to those of the switch $G^2$, the circuits of the closing coils $G^{10}$ and $G^{30}$ being respectively controlled by the contacts $N^{31}$ and $N^{21}$, whilst the contacts $G^{12}$ and $G^{32}$ are in parallel with the contact $G^{22}$.

The remaining contact $N^{13}$ of the contactor $N^1$ controls the energisation of a relay $P^1$ having a brief time lag, say one second. This relay has three normally open contacts $P^{10}P^{11}P^{12}$ and a normally closed contact $P^{13}$. Corresponding relays $P^2$ and $P^3$, respectively controlled by the contactor contacts $N^{23}$ and $N^{33}$, likewise have for contacts $P^{20}P^{21}P^{22}P^{23}$ and $P^{30}P^{31}P^{32}P^{33}$. The contacts $P^{10}P^{20}P^{30}$, respectively in series with the repeat contactor contacts $M^{10}M^{20}M^{30}$, control in parallel the energisation of a closing coil $G^{50}$ for the switch $G^5$ across the injection transformer secondary winding $D$, such energising circuit including an interlock contact $G^{51}$. The contacts $P^{11}P^{21}P^{31}$ in parallel control the energisation of the closing coil $G^{40}$ for the short-circuiting switch $G^4$ in series with an interlock contact $G^{41}$. The contacts $P^{12}P^{22}P^{32}$ in parallel control the energisation of the trip coils $G^{15}G^{25}G^{35}$ of the switches $G^1G^2G^3$, such trip coil circuits respectively including the interlock contacts $G^{13}G^{23}G^{33}$ and also including a further interlock contact $G^{43}$ on the short-circuiting switch $G^4$. The normally closed contacts $P^{13}P^{23}P^{33}$ are in series with one another in the circuit of the trip coil 45 for the short-circuiting switch. The switches $G^4G^5$ each have a further auxiliary switch $G^{42}$ or $G^{52}$ acting to short-circuit the current transformer $J$.

Thus if an earth-fault occurs on phase $A^1$, the beam relay $L^1$ will operate and will cause the operation of its repeat contactor $M^1$, thereby energising the contactor $N^1$ which holds itself closed for a time dependent on the time lag relay $O$. The contactor $N^1$ also energises the closing coil $G^{20}$ of the switch $G^2$ in the next phase and initiates the operation of the brief time lag relay $P^1$. The closing of the switch $G^2$ causes at contacts $G^{22}$ the tripping of the short-circuiting switch $G^4$, thus causing the current injection to suppress the arc and to hold the faulty phase at earth potential, until the relay $P^1$ operates. At the same time the switch $G^4$ on opening short-circuits the current transformer $J$ as an additional safeguard against simultaneous operation of two beam relays.

When the relay $P^1$ operates it breaks the tripping supply to the short-circuiting switch trip coil $G^{45}$ and energizes the closing coil $G^{40}$ of such switch, and it prepares the tripping circuit for the switch $G^2$ and the closing circuit for the switch $G^5$. The short-circuiting switch $G^4$ now closes and completes the tripping circuit for the switch $G^2$, which opens.

At this stage different operations may take place in accordance with the circumstances. If the earth-fault was only a transient fault, it will have been cleared during the injection period determined by the time lag of the relay $P^1$, and in this case nothing further will happen until the definite time limit relay $O$ opens its contacts $O^1$ to deenergise the contactor $N^1$ and thus to restore the whole system to normal.

If however the fault has failed to clear within the time lag of the relay $P^1$, the beam relay $L^1$ will again operate its repeat contactor $M^1$. Since the brief time lag relay $P^1$ is now holding its contacts $P^{10}$ closed, the closing of the repeat contactor contacts $M^{10}$ will cause the energisation of the closing coil $G^{50}$ of the switch $G^5$. This will short-circuit the current transformer $J$ and thus deenergise the beam relay $L^1$ and will also short-circuit the injection transformer secondary $D$ in the manner above described for the purpose of initating the operation of the normal discriminating protective gear to isolate the faulty section of the network.

If now a second earth-fault should meanwhile happen to have occurred on a different phase, the appropriate beam relay will operate and will bring about the necessary switch operation and current injection in an attempt to clear the second fault in a manner exactly analogous to that above described.

Figure 6 shows a modification of Figure 5 to suit injection from the high tension side of the power transformer $BB^1$, in the manner described with reference to Figure 3. In this modification the main circuits, including the injection transformer $DD^1$, the earthing resistance $E$ and the switches $F^1F^2F^3F^4F^5$, are all arranged as in Figure 3 in association with the high tension side of the power transformer $BB^1$, to replace the corresponding circuits of Figures 4 and 5 in association with the low tension side of the transformer. The relay system controlling the switches $F^1F^2F^3F^4F^5$ differs from that of Figure 5 in that the beam relays are also controlled from the high tension side, as shown in Figure 6. In this case the beam relays $L^1L^2L^3$ (for which the same reference letters will be used as in Figure 5 for simplicity) have voltage coils $L^{10}L^{11}L^{20}L^{21}L^{30}L^{31}$ and contacts $L^{14}L^{15}L^{16}\ldots$ arranged exactly as in the relays of Figure 5, but the current coils $L^{12}L^{13}\ldots$ are omitted. The voltage coils are energised from the secondary phase windings $Q^1Q^2Q^3$ of a five-limbed potential transformer, whose primary windings Q are connected to the phase conductors $A^1A^2A^3$ and have an earthed star-point. This transformer acts to reproduce on the secondary side the exact voltage changes which occur between the lines $A^1A^2A^3$ and earth. Consequently, in the event of an earth fault, say on phase $A^1$, the restraining voltage on the relay $L^1$ collapses and that relay operates, whilst relay $L^3$ restrains heavily and relay $L^2$ restrains slightly, in a manner analogous to that obtained by means of the current coils in the arrangement of Figure 5. The remaining relays and contactors, indicated by the letters MNOP with indices, are arranged exactly as in Figure 5, and the switches $F^1F^2F^3F^4F^5$ have closing and trip coil and associated circuits controlled by these relays as for the switches $G^1G^2G^3G^4G^5$ of Figure 5 (except that the auxiliary contacts $G^{42}$ and $G^{52}$ are omitted altogether since the current transformer J is not required for the operation of the beam relays).

As has been mentioned, the earthing resistance E must have a value suited to the earth capacity of the lines $A^1A^2A^3$, and whilst adjustment of the value of the resistance by a trial and error method will often adequately serve the purpose, it will usually be convenient to provide means for automatically effecting the desired adjustment to suit changes in the line capacity due for example to switching operations. One convenient arrangement suitable for this purpose is shown in Figure 7.

In this arrangement a current transformer $RR^1$ has its secondary $R^1$ in series in the neutral earthing connection, whilst its primary R is energised from a source $R^2$ of alternating current having a frequency different from the power frequency and preferably a high frequency which does not correspond to any harmonic of the power frequency. Thus the high frequency current is injected into a circuit including the earthing resistance E, the resistance of the lines $A^1A^2A^3$ and the capacitance of the lines to earth. At any chosen frequency this circuit has a definite power factor for perfect compensation under earth-fault conditions, and a power factor meter S provided with contacts $S^1S^2$ is inserted in the current transformer circuit, the arrangement being such that whenever the power factor in the circuit differs from the proper value, one or other of the contacts $S^1$ or $S^2$ will be operated in accordance with whether the injected high frequency current is leading or lagging. The resistance E is provided with a tapping control arm $E^2$ which can be driven in one direction or the other by a reversing motor T energised from an auxiliary source $T^1$ through a transformer $T^2$, the direction of rotation of the motor being controlled by the contacts $S^1$ and $S^2$ of the power factor meter. Both contacts $S^1$ and $S^2$ are normally open with the value of the resistance E properly adjusted, and if a change occurs in the line conditions, the operation of one of the contacts will start up the motor T in the appropriate direction to adjust the resistance E, the motor stopping when the power factor meter contact opens again when the correct adjustment has been made. It may be mentioned that a considerable tolerance is permissible in the position of the mid-point tapping on the resistance E, since this tapping is not in use at the time when current is being injected through the injection transformer $DD^1$, and it is consequently unimportant if, as the result of movement of the tapping control arm $E^2$, the mid-point tapping is not strictly at the mid-point of the resistance.

The automatic adjusting device of Figure 7 has been described with reference to the arrangement of Figures 3 and 6, but it will be appreciated that it is equally applicable to the adjustment of the resistance $E^1$ of Figures 4 and 5.

It will be appreciated that although the improved arrangement according to the invention causes suppression of the arc by an action somewhat analogous to that of the Petersen coil, its operating characteristics are very different from those of the Petersen coil. Thus since the neutral point is connected directly or indirectly to earth through a resistance (usually relatively large) the earthing circuit is non-resonant and there is no risk of over-voltages due to resonance. A further advantage of the improved arrangement as compared with the Petersen coil, is that the current injection can be maintained for any chosen time period as may be found necessary to ensure the suppression of the arc, and this greater measure of control renders it unnecessary for the value of the earthing resistance to be adjusted as accurately as the reactance of the Petersen coil. The arrangement is also more flexible than the Petersen coil arrangement in so far as it has two adjustable elements, the value of the earthing resistance and the injection transformer ratio, which enable it more readily to be adapted to suit the characteristics of a particular network.

In general a single arc-suppression arrangement according to the invention will serve for a complete network, and it should preferably be installed near the main point of supply of the network. The arrangement is generally applicable to any overhead line network (whether or not cable sections are included) which is suitable for resistance earthing. The invention is also of advantage, preferably in conjunction with co-ordinating arc-gaps, for protecting substation apparatus connected to the network against excess voltages without affecting the reliability of the protected network. The coordinating gaps should be fitted at the junctions of the overhead lines and the substations and should be set to flash over at a voltage below that of the substation apparatus. In this way an excess voltage coming in from the overhead line will cause a flashover of the arc gap instead of causing damage to the substation apparatus, and the arc-suppression arrangement will ensure that this flashover will not give rise to an unnecessary interruption in the supply.

It is to be understood that the arrangements above described have been given by way of example only and that various modifications may be made within the scope of the invention. Thus, for example, whilst in the arrangements above described a resistance is used for the direct or indirect earthing of the neutral point, any other suitable impedance may be employed which does not cooperate with the capacitance to earth of the network conductors to form a resonant circuit.

Again various modifications shown only in certain of the figures of the drawings are equally applicable to other figures. Thus the earthing resistance may be in circuit with either the primary or the secondary of the injection transformer irrespective of whether the injection voltage is derived from the high tension side or the low tension side of the power transformer and similarly the side of the power transformer from which the voltage coils of the beam relays are energised need not be the same as that from which the injection voltage is derived.

What I claim as my invention and desire to secure by Letters Patent is:—

1. An earth-fault control arrangement for a polyphase A. C. system, comprising an earth connection from a neutral point of the system, an injection transformer having its secondary winding connected in series in the earth connection, an impedance, which is substantially non-inductive at the frequency of the supply system, connected in series with one of the windings of the injection transformer, and switching means operative on the occurrence of an earth fault on one of the phases of the system to supply to the primary circuit of the injection transformer a voltage having the same frequency as the supply system and a phase such that the voltage injected by the secondary winding of the transformer into the fault loop comprising the earth connection, the part of the faulty phase between the neutral point and the fault, the fault itself, and earth, produces in the fault loop a current which is substantially in phase opposition to the earth-fault current, the magnitudes of the impedance and the voltage supplied to the primary circuit of the injection transformer being such that the current produced in the fault loop by the injection voltage is substantially equal to the earth-fault current flowing before operation of the switching means.

2. An earth-fault control arrangement for a polyphase A. C. system, comprising an earth connection from a neutral point of the system, an injection transformer having its secondary winding connected in series in the earth connection, an impedance, which is substantially non-inductive at the frequency of the supply system, connected in series with one of the windings of the injection transformer, and switching means operative on the occurrence of an earth fault on one of the phases of the system to supply to the primary circuit of the injection transformer a voltage derived from that phase of the system whose voltage lags 120° behind the voltage of the faulty phase so that the voltage injected by the secondary winding of the transformer into the fault loop comprising the earth connection, the part of the faulty phase between the neutral point and the fault, the fault itself, and earth, produces in the fault loop a current which is substantially in phase opposition to the earth-fault current, the magnitudes of the impedance and the voltage supplied to the primary circuit of the injection transformer being such that the current produced in the fault loop by the injection voltage is substantially equal to the earth-fault current flowing before operation of the switching means.

3. An earth-fault control arrangement for a polyphase A. C. system, comprising an earth connection from a neutral point of the system, an injection transformer having its secondary winding connected in series in the earth connection, an impedance, which is substantially non-inductive at the frequency of the supply system, connected in series with one of the windings of the injection transformer, a normally closed switch connected between the mid-points of the impedance and the injection transformer winding in series therewith and switching means operative on the occurrence of an earth fault on one of the phases of the system to open the normally closed switch and to supply to the primary circuit of the injection transformer a voltage having the same frequency as the supply system and a phase such that the voltage injected by the secondary winding of the transformer in to the fault loop comprising the earth connection, the part of the faulty phase between the neutral point and the fault, the fault itself, and earth, produces in the fault loop a current which is substantially in phase opposition to the earth-fault current, the magnitudes of the impedance and the voltage supplied to the primary circuit of the injection transformer being such that the current produced in the fault loop by the injection voltage is substantially equal to the earth-fault current flowing before operation of the switching means.

4. An earth-fault control arrangement for a polyphase A. C. electric supply system fed through a step-up transformer, comprising an earth connection from a neutral point of the system associated with the secondary winding of the power transformer, an injection transformer having its secondary winding in series in the earth connection, an impedance, which is substantially non-inductive at the frequency of the supply system, also connected in series in the earth connection, and switching means operative on the occurrence of an earth fault on one of the phases of the system to connect the primary winding of the injection transformer to one of the healthy phases on the high tension side of the power transformer whereby the voltage injected by the secondary winding of the injection transformer into the fault loop comprising the earth connection, the part of the faulty phase between the neutral point and the fault, the fault itself and earth, produces in the fault loop a current which is substantially in phase opposition to the earth-fault current, the transformation ratio of the injection transformer and the magnitude of the impedance being such that the current produced in the fault loop by the injection voltage is substantially equal to the earth-fault current flowing before operation of the switching means.

5. An earth-fault control arrangement for a polyphase A. C. electric supply system fed through a step-up transformer, comprising an earth connection from a neutral point of the system associated with the secondary winding of the power transformer, an injection transformer having its secondary winding in series in the earth connection, an impedance, which is substantially non-inductive at the frequency of the supply system, also connected in series in the earth connection, a normally closed switch connecting the mid-points of the impedance and the secondary winding of the injection transformer so as in effect to short-circuit the injection transformer, and switching means operative on the occurrence of an earth fault on one of the phases of the system to open the short-circuiting switch and to energize the primary winding of the injection transformer by a voltage derived from that phase on the high tension side of the power transformer whose voltage lags 120° behind the voltage of the faulty phase whereby the voltage injected by the secondary winding of the injection transformer into the fault loop comprising the earth connection, the part of the faulty phase between the neutral point and the fault, the fault itself and earth, produces in the fault loop a current which is substantially in phase opposition to the earth-fault current, the transformation ratio of the injection transformer and the magnitude of the impedance being such that the current produced in the fault loop by the injection voltage is substantially equal to the earth-fault current flowing before operation of the switching means.

6. An earth-fault control arrangement for a polyphase A. C. electric supply system fed through a step-up transformer, comprising an earth connection from a neutral point of the system associated with the secondary winding of the power transformer, an injection transformer having its secondary winding in series in the earth connection, an impedance, which is substantially non-inductive at the frequency of the supply system connected in series with the primary winding of the injection transformer, a normally closed switch connecting the mid-points of the impedance and the primary winding of the injection transformer so as in effect to short-circuit such transformer, and switching means operative on the occurrence of an earth fault on one of the phases of the system to open the short-circuiting switch and to supply to the primary winding of the injection transformer a voltage derived from the low tension side of the power transformer whereby the voltage injected by the secondary winding of the injection transformer into the fault loop comprising the earth connection, the part of the faulty phase between the neutral point and the fault, the fault itself and earth, produces in the fault loop a current which is substantially in phase opposition to the earth-fault current, the transformation ratio of the injection transformer and the magnitude of the impedance being such that the current produced in the fault loop by the injection voltage is substantially equal to the earth-fault current flowing before operation of the switching means.

7. An earth-fault control arrangement for a three-phase electric supply system as claimed in claim 2, in which the switching means controlling the voltage injection and the selection of the phase from which the injection voltage is derived include a group of balanced beam relays selectively responsive to earth-fault conditions on the system.

8. An earth-fault control arrangement for a polyphase electric supply system as claimed in claim 4, in which the switching means controlling the voltage injection and the selection of the phase from which the injection voltage is derived include a potential transformer connected to the high tension side of the power transformer, and a group of balanced beam relays having operating and restraining voltage coils energised from such potential transformer so as to render the relays selectively responsive to earth-fault conditions on the system.

9. An earth-fault control arrangement for a polyphase electric supply system as claimed in claim 6, in which the switching means controlling the voltage injection and the selection of the phase from which the injection voltage is derived include a potential transformer connected to the low tension side of the power transformer, a current transformer on the neutral earthing connection, and a group of balanced beam relays having operating and restraining voltage coils energised from the potential transformer and current coils energised from the current transformer so as to render the relays selectively responsive to earth-fault conditions on the system.

10. The combination with the features set forth in claim 1, of means for maintaining the voltage injection for a predetermined time sufficient to ensure suppression of the fault arc in the event of a transient fault.

11. The combination with the features set forth in claim 3, of means for maintaining the voltage injection for a predetermined time sufficient to ensure suppression of the fault arc in the event of a transient fault.

12. The combination with the features set forth in claim 1, of means for maintaining the voltage injection for a predetermined time sufficient to ensure suppression of the fault arc in the event of a transient fault, and means whereby in the event of the fault persisting after the end of the voltage injection period the neutral point of the system is directly earthed independently of the earthing impedance.

13. An earth-fault control arrangement for a polyphase electric supply system as claimed in claim 33, in which the switching means controlling the voltage injection and the selection of the phase from which the injection voltage is derived include a potential transformer connected to the high tension side of the power transformer, a group of balanced beam relays having operating and restraining voltage coils energized from such potential transformer so as to render the relays selectively responsive to earth-fault conditions on the system, means for maintaining the voltage injection for a predetermined time sufficient to ensure suppression of the fault arc in the event of a transient fault, and means whereby in the event of the fault persisting after the end of the voltage injection period the neutral point of the system is directly earthed independently of the earthing impedance.

14. An earth-fault control arrangement for a polyphase A. C. electric supply system fed through a step-up transformer, comprising an earth connection from a neutral point of the system associated with the secondary winding of the power transformer, an injection transformer having its secondary winding in series in the earth connection, an earthing impedance which is substantially non-inductive at the frequency of the supply system connected in series with the primary winding of the injection transformer, a normally closed switch connecting the mid-points of such primary winding and the earthing impedance so as in effect to short-circuit the injection transformer, a normally open switch connecting the neutral point and earth, a potential transformer connected to the low tension side of the power transformer, a current transformer on the neutral earthing connection, a group of balanced beam relays having operating and restraining coils energized from the current transformer so as to be selectively responsive to earth-fault conditions on the system, means whereby such balanced beam relays act on the occurrence of an earth fault on one of the phases of the system to open the normally closed short-circuiting switch and to energize the injection transformer primary winding by a voltage derived from the low tension side of the power transformer whereby the voltage injected by the secondary winding of the injection transformer into the fault loop comprising the earth connection, the part of the faulty phase between the neutral point and earth, the fault itself and earth produces in the fault loop a current which is substantially equal and opposite to the earth fault current flowing in the fault loop prior to the application of the injection voltage, a time-lag device for maintaining the voltage injection for a predetermined time sufficient to ensure suppression of the arc in the event of a transient fault, and means whereby in the event of the fault persisting after the end of the voltage injection period the normally open switch between the neutral point and earth is closed.

15. The combination with the features set forth in claim 1, of means for automatically adjusting the value of the impedance in accordance with the capacitance to earth of the system.

16. The combination with the features set forth in claim 5, of means for automatically adjusting the value of the impedance in accordance with the capacitance to earth of the system.

17. The combination with the features set forth in claim 14, of means for automatically adjusting the value of the earthing impedance in accordance with the capacitance to earth of the system.

18. The combination with the features set forth in claim 1, of means for injecting into a circuit including the neutral earthing connection and the capacitance to earth of the system a current of frequency different from the power frequency, a contact-making power factor meter which operates its contacts in accordance with the power factor of such injected current, a variable tapping on the earthing impedance, and means whereby such tapping is adjusted under the control of the power factor meter contacts in accordance with the capacitance to earth of the system.

19. The combination with the features set forth in claim 3, of means for injecting into a circuit including the neutral earthing connection and the capacitance to earth of the system a current of frequency different from the power frequency, a contact-making power factor meter which operates its contacts in accordance with the power factor of such injected current, a variable tapping on the earthing impedance, and means whereby such tapping is adjusted under the control of the power factor meter contacts in accordance with the capacitance to earth of the system.

20. An earth-fault control arrangement for a polyphase A. C. electric supply system fed through a step-up transformer, comprising an earth connection from a neutral point of the system associated with the secondary winding of the power transformer, an injection transformer having its secondary winding in series in the earth connection, an impedance, which is substantially non-inductive at the frequency of the supply system connected in series with the primary winding of the injection transformer, and switching means operative on the occurrence of an earth fault on one of the phases of the system to supply to the primary circuit of the injection transformer a voltage having the same frequency as the supply system and a phase such that the voltage injected by the secondary winding of the transformer into the fault loop comprising the earth connection, the part of the faulty phase between the neutral point and the fault, the fault itself, and earth, produces in the fault loop a current which is substantially in phase opposition to the earth-fault current, the magnitudes of the impedance and the voltage supplied to the primary circuit of the injection transformer being such that the current produced in the fault loop by the injection voltage is substantially equal to the earth-fault current flowing before operation of the switching means.

21. An earth-fault control arrangement for a polyphase A. C. electric supply system fed through a step-up transformer, comprising an earth connection from a neutral point of the system associated with the secondary winding of the power transformer, an injection transformer having its secondary winding in series in the earth connection, an impedance, which is substantially non-inductive at the frequency of the supply system connected in series with one of the windings of the injection transformer, and switching means operative on the occurrence of an earth fault on one of the phases of the system to supply to the primary circuit of the injection transformer a voltage derived from the high tension side of the power transformer whereby the voltage injected by the secondary winding of the transformer into the fault loop comprising the earth connection, the part of the faulty phase between the neutral point and the fault, the fault itself, and earth, produces in the fault loop a current which is substantially in phase opposition to the earth-fault current, the magnitudes of the impedance and the voltage supplied to the primary circuit of the injection transformer being such that the current produced in the fault loop by the injection voltage is substantially equal to the earth-fault current flowing before operation of the switching means.

22. An earth-fault control arrangement for a polyphase A. C. electric supply system fed through a step-up transformer, comprising an earth connection from a neutral point of the system associated wtih the secondary winding of the power transformer, an injection transformer having its secondary winding in series in the earth connection, an impedance, which is substantially non-inductive at the frequency of the supply system connected in series with one of the windings of the injection transformer, and switching means operative on the occurrence of an earth fault on one of the phases of the system to supply to the primary circuit of the injection transformer a voltage derived from the low tension side of the power transformer whereby the voltage injected by the secondary winding of the transformer into the fault loop comprising the earth connection, the part of the faulty phase between the neutral point and the fault, the fault itself, and earth, produces in the fault loop a current which is substantially in phase opposition to the earth-fault current, the magnitudes of the impedance and the voltage supplied to the primary circuit of the injection transformer being such that the current produced in the fault loop by the injection voltage is substantially equal to the earth-fault current flowing before operation of the switching means.

23. An earth-fault control arrangement for a polyphase A. C. electric supply system fed through a step-up transformer, comprising an earth connection from a neutral point of the system associated with the secondary winding of the power transformer, an injection transformer having its secondary winding in series in the earth connection, an impedance, which is substantially non-inductive at the frequency of the supply system connected in series with one of the windings of the injection transformer, a potential transformer connected to the high tension side of the power transformer, a group of balanced beam relays having operating and restraining voltage coils energized from such potential transformer so as to render the relays selectively responsive to earth-fault conditions on the system, and means whereby on the occurrence of an earth fault on one of the phases of the system the balanced beam relays cause a voltage having the same frequency as the supply system and a phase such that the voltage injected by the secondary winding of the transformer into the fault loop comprising the earth connection, the part of the faulty phase between the neutral point and the fault, the fault itself, and earth, produces in the fault loop a current which is substantially in phase opposition to the earth-fault current, the magnitudes of the impedance and the voltage supplied to the primary circuit of the injection transformer being such that the current produced in the fault loop by the injection voltage is substantially equal to the earth-fault current flowing before operation of the switching means.

24. An earth-fault control arrangement for a polyphase A. C. electric supply system fed through a step-up transformer, comprising an earth connection from a neutral point of the system associated with the secondary winding of the power transformer, an injection transformer having its secondary winding in series in the earth connection, an impedance, which is substantially non-inductive at the frequency of the supply system connected in series with one of the windings of the injection transformer, a potential transformer connected to the low tension side of the power transformer, a current transformer on the neutral earthing connection, a group of balanced beam relays having operating and restraining voltage coils energized from the potential transformer and current coils energized from the current transformer so as to render the relays selectively responsive to earth-fault conditions on the system, and means whereby on the occurrence of an earth fault on one of the phases of the system the balanced beam relays cause a voltage having the same frequency as the supply system and a phase such that the voltage injected by the secondary winding of the transformer into the fault loop comprising the earth connection, the part of the faulty phase between the neutral point and the fault, the fault itself, and earth, produces in the fault loop a current which is substantially in phase opposition to the earth-fault current, the magnitudes of the impedance and the voltage supplied to the primary circuit of the injection transformer being such that the current produced in the fault loop by the injection voltage is substantially equal to the earth-fault current flowing before operation of the switching means.

HENRY LEYBURN.